United States Patent
Johnson

(10) Patent No.: US 8,827,574 B2
(45) Date of Patent: Sep. 9, 2014

(54) CAMERA MOUNTING ASSEMBLY

(76) Inventor: Joseph M. Johnson, San Luis Obispo, CA (US)

( * ) Notice: Subject to any disclaimer, the term of this patent is extended or adjusted under 35 U.S.C. 154(b) by 100 days.

(21) Appl. No.: 13/213,867

(22) Filed: Aug. 19, 2011

(65) Prior Publication Data

US 2012/0106944 A1   May 3, 2012

Related U.S. Application Data

(60) Provisional application No. 61/409,884, filed on Nov. 3, 2010.

(51) Int. Cl.
*F16M 11/04* (2006.01)
*G03B 17/00* (2006.01)
*G03B 17/56* (2006.01)

(52) U.S. Cl.
CPC ..................................... *G03B 17/56* (2013.01)
USPC ........................................ 396/419; 248/187.1

(58) Field of Classification Search
USPC ......... 248/187.1; 396/419, 544; 348/376, 373
See application file for complete search history.

(56) References Cited

U.S. PATENT DOCUMENTS

| | | | | |
|---|---|---|---|---|
| 2,589,892 | A * | 3/1952 | Suzukawa | 248/187.1 |
| 6,196,504 | B1 * | 3/2001 | Lemke | 248/187.1 |
| 6,234,653 | B1 * | 5/2001 | Karton | 362/408 |
| 7,753,599 | B2 * | 7/2010 | Segawa et al. | 396/422 |
| 2011/0129210 | A1 * | 6/2011 | McGucken | 396/422 |

OTHER PUBLICATIONS

Really Right Stuff 2002 Catalog, 52 pgs.

* cited by examiner

*Primary Examiner* — Clayton E Laballe
*Assistant Examiner* — Noam Reisner
(74) *Attorney, Agent, or Firm* — Chernoff Vilhauer McClung & Stenzel, LLP

(57) ABSTRACT

A camera mounting assembly includes a base member or plate for holding a camera and a side member or plate. In an exemplary embodiment, lower slots on the base plate or side slots on the side plate are gripped by a vertical support's quick-release mechanism to mount the camera in a landscape or portrait orientation, respectively, the camera being generally centered and evenly balanced over the support in either case. The side member is detachably fastened to the base member, which modular construction permits separately timed purchase of the base member and side member as allowed by the user's budget and further permits breakdown of the assembly for ease of transport. The side member may be generally L-shaped with a lower arm length less than the side arm length, which also facilitates transport. Other components may be detachably added such as a hand grip facilitating freehand shooting with the camera.

22 Claims, 19 Drawing Sheets

DETAIL D
SCALE 4 : 1

CAMERA MOUNTING ASSEMBLY

CROSS-REFERENCE TO RELATED APPLICATIONS

This application claims the benefit of U.S. Provisional App. No. 61/409,884, filed Nov. 3, 2010.

TECHNICAL FIELD

This invention relates to a camera mounting assembly for mounting a camera on a vertical support, such as a stand or tripod. In particular, the invention relates to a mounting assembly for adjustably mounting the camera on the vertical support in different orientations.

BACKGROUND OF THE INVENTION

It is known in the art to provide a vertical camera support including a support platform having a quick-release mechanism, such as one manufactured by ARCA-Swiss Phototechnik AG. This quick-release mechanism has opposed jaws selectively moveable to a clamping position for selectively gripping slots that are formed in a carrier holding the camera. The mounting mechanism may include a turnable thumb screw or pivoting lever for moving and securing the jaws in the clamping position. This allows the camera to be quickly mounted on the support or taken off the support for freehand shooting.

The support platform is mounted to the vertical camera support by means of a ball-joint. This allows the carrier and camera to be pivoted from a landscape (horizontal) orientation to a portrait (vertical) orientation. The weight of the camera and carrier are substantially centered over the camera support when the camera is in the landscape orientation. However, when the camera is pivoted about the ball joint to the portrait orientation, the weight of the camera and carrier are off kilter from the central axis of the camera support, thereby making the vertical support prone to being tipped over or making the camera more susceptible to environmental factors such as wind drafts. Furthermore, if the camera is being used for close-up shots, the camera lens is significantly displaced along the vertical and horizontal directions during repositioning so that the vertical support must now be repositioned both laterally and vertically through tedious trial-and-error until the object being photographed is brought back within the field of view of the camera lens.

U.S. Pat. No. 7,588,376 describes a camera holder in which the camera can be adjustably moved along a bow-shaped arm between a landscape orientation and a portrait orientation. However, this holder, with its multiple parts, is relatively expensive to manufacture and purchase and is not readily transported. Moreover, the camera and carrier are still off balance when the camera is in the portrait orientation thereby causing the camera and support to remain susceptible to undesirable vibration and being toppled over.

What is desired, then, is a camera mounting assembly which may be made available for purchase at relatively lower cost while preferably allowing the camera to be mounted in stable position on the support in different orientations without requiring adjustment of the support.

BRIEF SUMMARY OF THE INVENTION

In a first aspect of the invention, a camera mounting assembly is provided including a base member and a side member. The base member has an upper portion configured to support a lower surface of the camera and a lower portion forming an opposite pair of lower slots. The side member forms an opposite pair of side slots. The assembly further includes a fastening element configured to detachably fasten together the side member and the base member such that when the lower surface of the camera is supported by the base member, at least a portion of the side member is aligned with a side surface of the camera and such that a pair of moveable jaws of the quick-release mechanism are selectively engageable with the lower slots and side slots to adjustably mount the camera in a landscape orientation and a portrait orientation, respectively, while maintaining the camera in a generally centered position over the vertical support. The detachable construction of the members permits a user to purchase the base and side members at separate times as their budget allows while the slots formed in the members enable quick mounting of the camera either in the landscape or portrait orientation while the camera is stably balanced over the vertical support.

In a second aspect of the invention, a camera mounting assembly is provided including a base member and a side member. The base member has an upper portion configured to receive a lower surface of the camera and a lower portion, the lower portion being adapted for selective mounting on the vertical support such that the camera is positioned in a landscape orientation. The side member is detachably fastenable to the base member such that at least a portion of the side member extends along a side surface of the camera received by the base member, the side member forming an opposite pair of side slots adapted for selective gripped engagement by a pair of moveable jaws of the quick-release mechanism such that the camera is adjustably mountable in a portrait orientation. In addition, at least one of the base member and the side member include an alignment mechanism for automatically aligning the base member and the side member as the base member and the side member are being positioned for detachable fastening. The detachable construction of the members permits the entire assembly to be purchased in parts, as the purchaser's budget allows, while the alignment mechanism facilitates easy fastening of the members together.

In a third aspect of the invention, a camera mounting assembly is provided including a base member and a side member. The base member has an upper portion adapted to engage a lower surface of the camera and a lower portion adapted to be selectively mounted on the vertical support such that the camera is positioned in a landscape orientation. The side member has a side portion forming an opposite pair of inclined edges. The assembly further includes at least one fastening element adapted to detachably fasten the side member and the base member such that when the camera is engaged by the base member, the side portion of the side member is aligned with a side surface of the camera whereupon the inclined edges are positioned for selective gripped engagement by a pair of moveable jaws of the quick-release mechanism so as to position the camera in a portrait orientation. The modular construction of the assembly permits purchase of the entire assembly over an interval of time and further permits breakdown of the assembly for convenient transport. In addition, the camera may be mounted in different orientations for providing both landscape and portrait shots.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
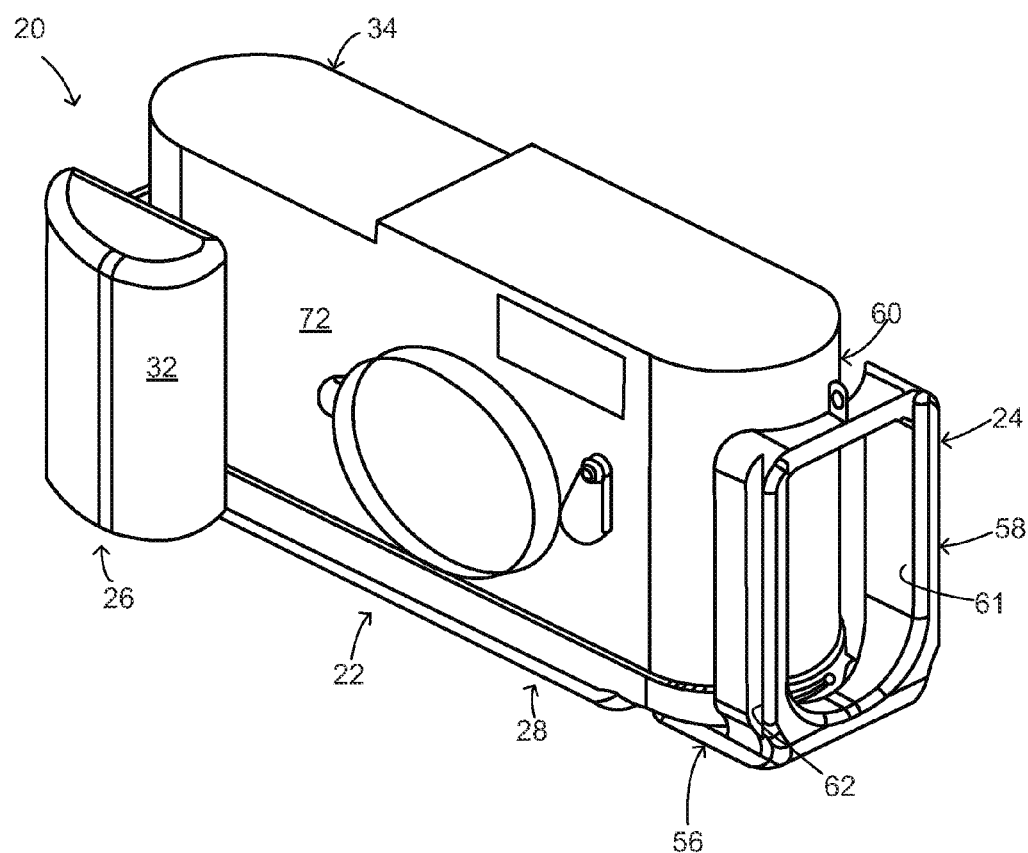
FIG. 1 is a perspective view showing an exemplary camera mounting assembly holding a camera and fully configured with base member, side member, and hand grip accessory.

FIG. 1 shows a camera mounting assembly 20 that when fully configured as shown, includes a base member or plate 22, an L-shaped side member or plate 24, and a second camera accessory 26. The side member and second accessory are detachably fastened to a lower portion 28 of the base plate, preferably at lower corner portions 30a and 30b depicted in FIG. 7. The second camera accessory may be configured as a hand grip 32 as shown. As further discussed below, the modular and compact construction depicted enables adjustable mounting of a conventional camera 34 on a vertical support in a manner compatible with convenient purchase, transport, and reconfiguration of the assembly.

The various pieces of the assembly 20 of FIG. 1 are each precision machined in a computed numerically controlled (CNC) process from aluminum stock for a well-fitted, durable, and lightweight construction. Each piece is anodized satin black to match the camera finish.

Figure 2:
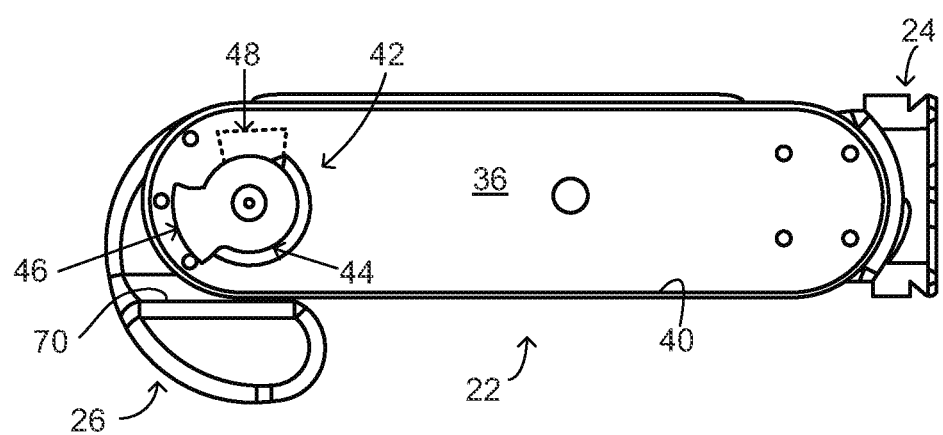
FIG. 2 is top plan view of the camera mounting assembly of FIG. 1 showing, in particular, details of the upper portion of the base member.
Figure 3:
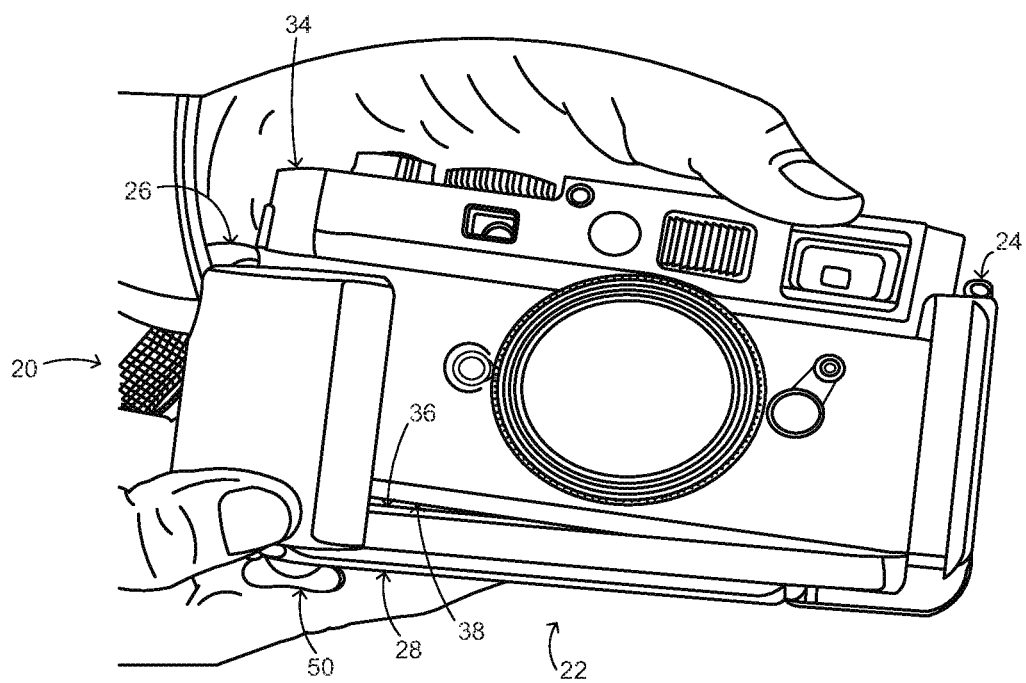
FIG. 3 is a front view of the camera mounting assembly of FIG. 1 showing how a camera is removably inserted into the assembly.

FIG. 3 shows the camera 34 being removably inserted into the camera mounting assembly 20. The base plate 22 has an upper portion 36 adapted to receive and hold securely the lower surface 38 of the camera (e.g., a Leica M8 or M9 camera for the particular base plate shown). In particular, referring also to FIG. 2, the upper portion 36 includes an upwardly projecting lip 40. This lip defines a shallow receptacle for holding, in close-fitting engagement, the camera's lower surface. This prevents the camera from twisting on the base plate about a direction perpendicular to the plane of the plate. More generally, the plate's upper portion is dimensioned to conform to the shape of the camera's lower surface without intervening cushioning. This reduces the possibility of camera vibration because there is direct mass coupling between the camera and base plate and sponginess in the coupling system between the camera and vertical support is avoided.

Referring to FIG. 2, the base plate includes a catch mechanism 42 for selectively securing the lower surface to the upper portion by means of a latch 44 mounted for pivoting movement between a first position 46 (illustrated in solid line view) unlocked from the lower surface and a second position 48 (illustrated in dashed line view) secured to the lower surface. The latch is controlled or operated from the lower portion 28 by a lower handle 50 (FIG. 3). In this manner, the camera may be easily and quickly released from the base plate to facilitate, for example, secure digital (SD) memory card or battery swaps.

Figure 7:
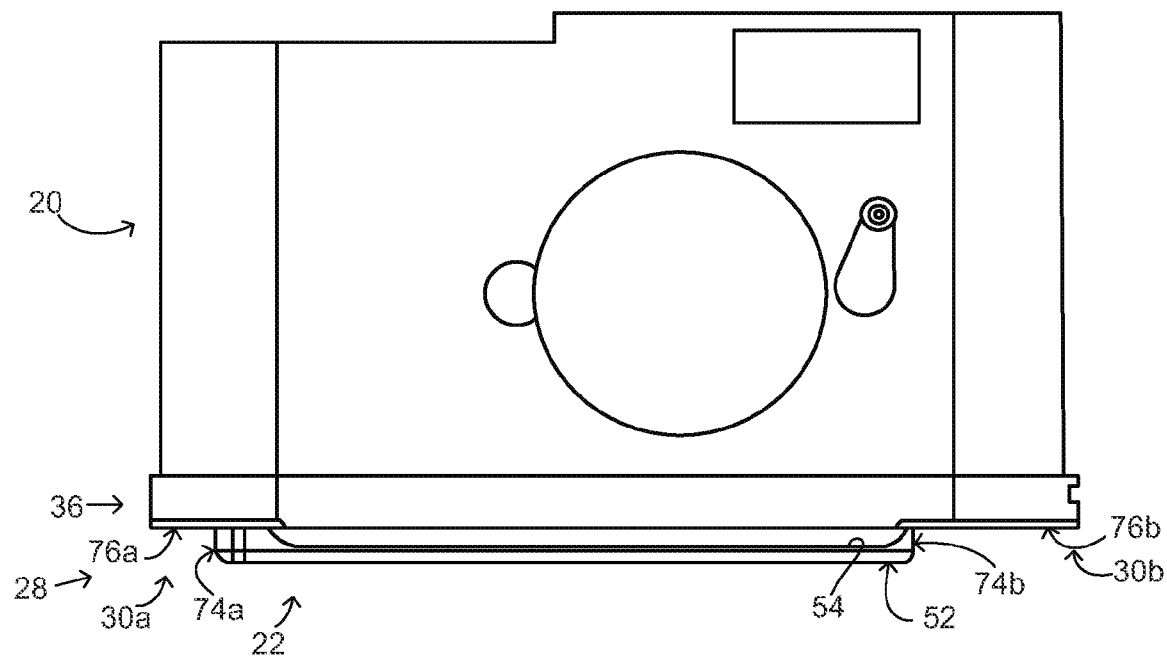
FIG. 7 is a front view of the camera mounting assembly of FIG. 1 configured with the base member alone.

Referring now to FIG. 7, which shows the base plate 22 prior to attachment of the L-shaped side plate 24 or second camera accessory 26, the lower portion 28 of the base plate includes a raised central member 52 forming an opposite pair of elongate lower slots 54 (the front slot being visible in the front view of FIG. 7). Referring again to FIG. 1, the side plate 24 includes a lower arm 56 and a side arm 58, these arms being in generally L-shaped arrangement with each other such that when the lower arm is detachably fastened to the base plate, the side arm extends along or is aligned with a side surface 60 of the camera 34. The side arm may form an opening 61 providing access to the side surface and reducing the weight of the side plate. The side arm forms an opposite pair of elongate side slots 62. In the embodiment shown, at least the outer side of each slot 54 in the base plate and each slot 62 in the side plate forms a dove-tail shaped edge (e.g., extending at a forty-five degree angle).

Figure 5:
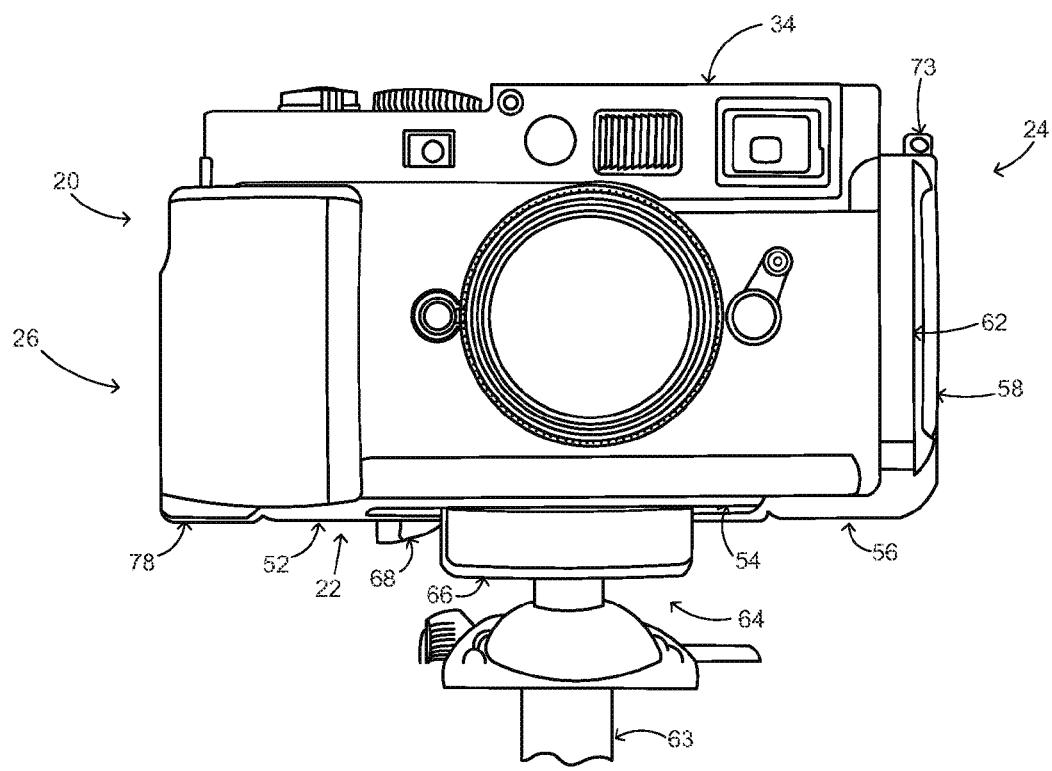
FIG. 5 is a front view of the camera mounting assembly of FIG. 1 being gripped in a landscape orientation by the jaws of a quick-release mechanism of a vertical support.
Figure 6:
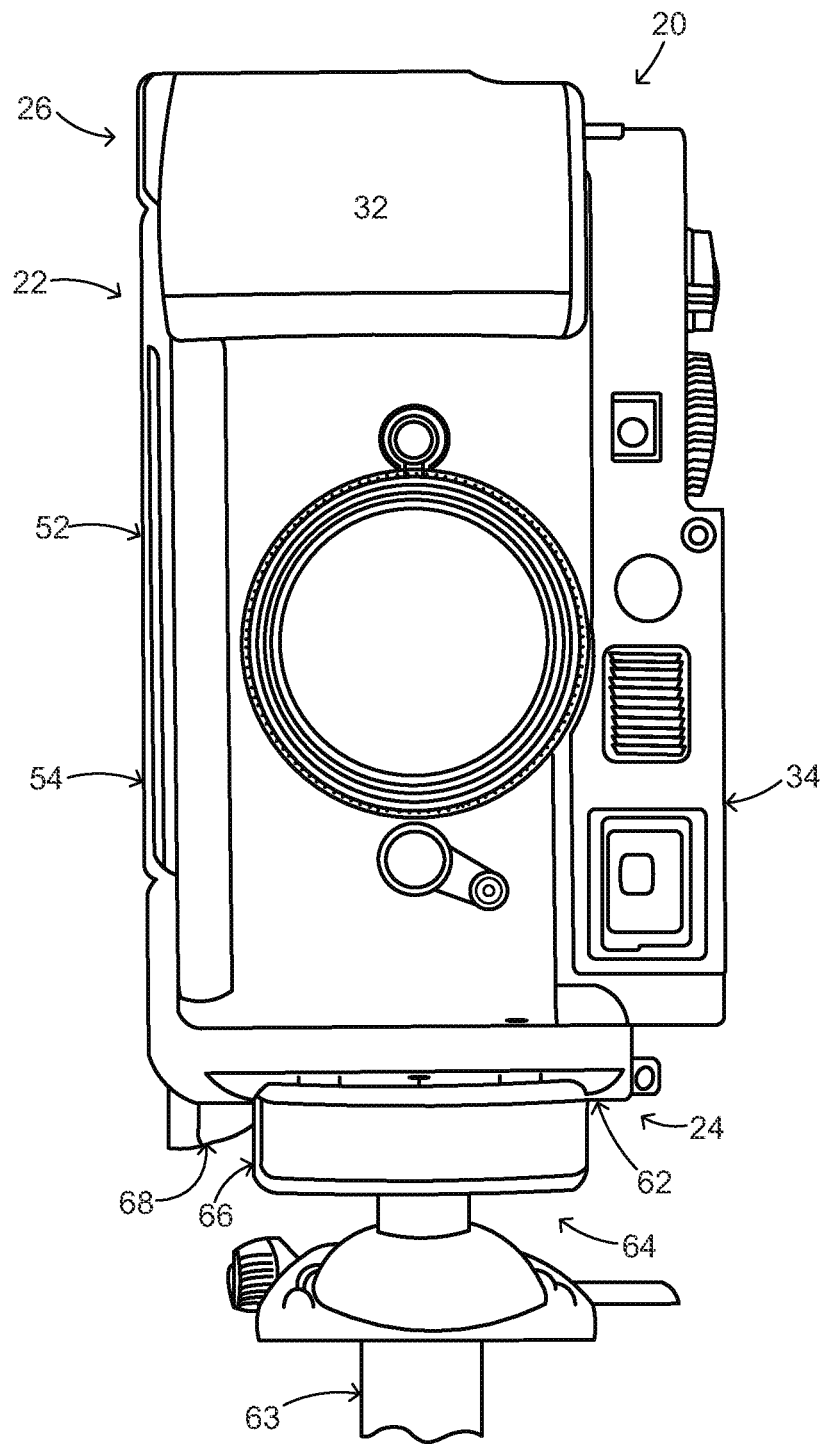
FIG. 6 is a front view of the camera mounting assembly of FIG. 1 being gripped in a portrait orientation by the jaws of a quick-release mechanism of a vertical support.

Referring to FIG. 5, the dovetailed slots 54 of the base plate 22 enable the camera 34 to be securely mounted quickly on a vertical support 63 in a landscape (horizontal) orientation. In particular, the support may be conventionally provided with a quick release mechanism 64 having moveable jaws 66 that may quickly be brought into gripped engagement with the lower slots merely by pivoting movement of a clamping lever 68. Similarly, referring to FIG. 6, the dovetailed slots 62 of the L-shaped plate 24 enable the camera to be securely mounted quickly on the same vertical support in a portrait (vertical) orientation wherein the moveable jaws are brought into gripped engagement with the side slots. From FIGS. 5 and 6, it will be noted that the camera may be quickly mounted in either the landscape or portrait orientation so as to maintain a generally centered position over the vertical support, that is, with the center point of the camera lens maintained in a substantially centered position over the support. This enables close up shooting of a nearby object without the need to laterally reposition the vertical support even if the camera is repositioned back-and-forth between landscape and portrait orientations. At the same time, as also indicated in FIGS. 5 and 6, the weight of the camera and mounting assembly 20 maintain a position generally balanced evenly over the vertical support. This ensures the support is not easily toppled over and lessens the susceptibility of the camera to any vibrations that might otherwise occur due to external factors such as wind drafts.

Figure 4:
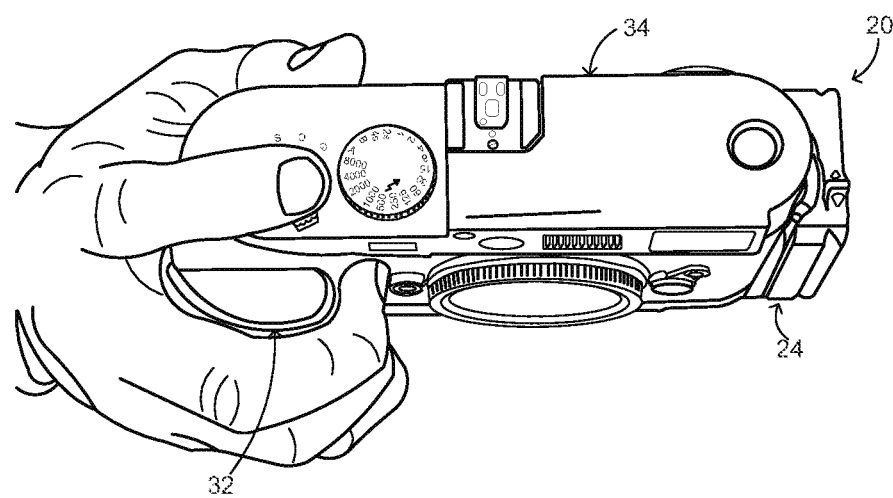
FIG. 4 is top view showing use of the hand grip of the camera mounting assembly of FIG. 1 during freehand shooting with the camera.

As indicated in FIG. 4, the assembly 20 may also be completely removed from the vertical support 63, and the camera 34 conveniently handled by hand grip 32 for freehand shooting. Referring to FIGS. 1 and 2, the hand grip is formed by an upper portion 70 of the second camera accessory 26, which upper portion extends along a front surface 72 of the camera being held by the base plate 22.

Figure 8:
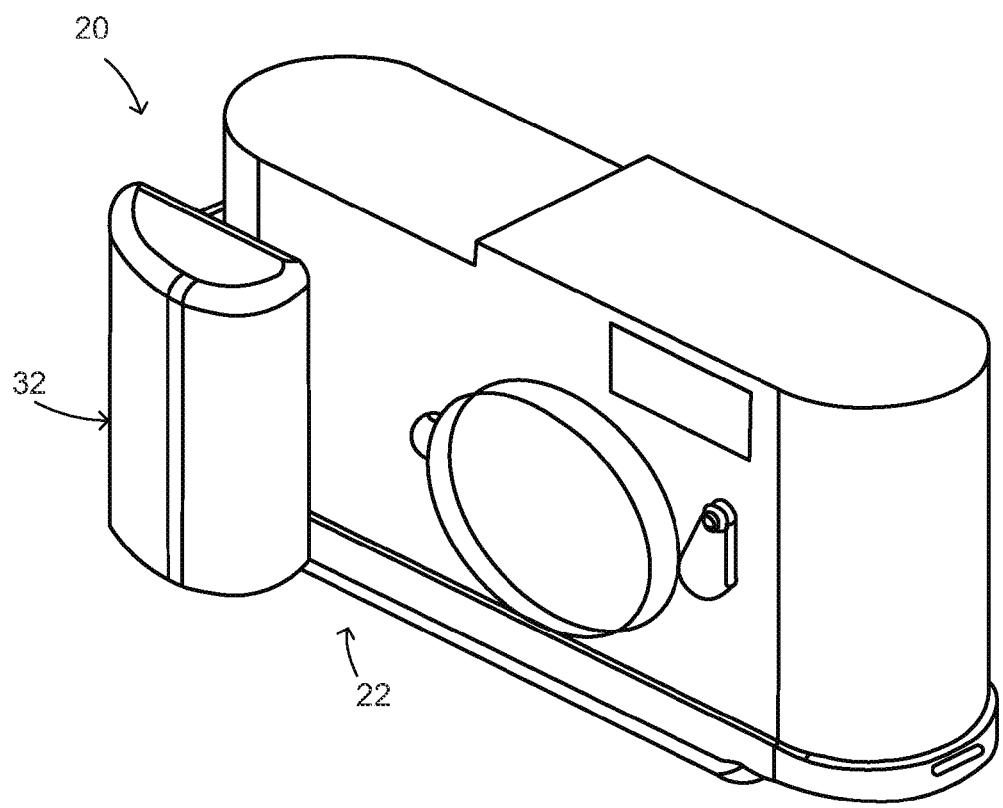
FIG. 8 is a perspective view of the camera mounting assembly of FIG. 1 configured with the base member and hand grip.
Figure 9:
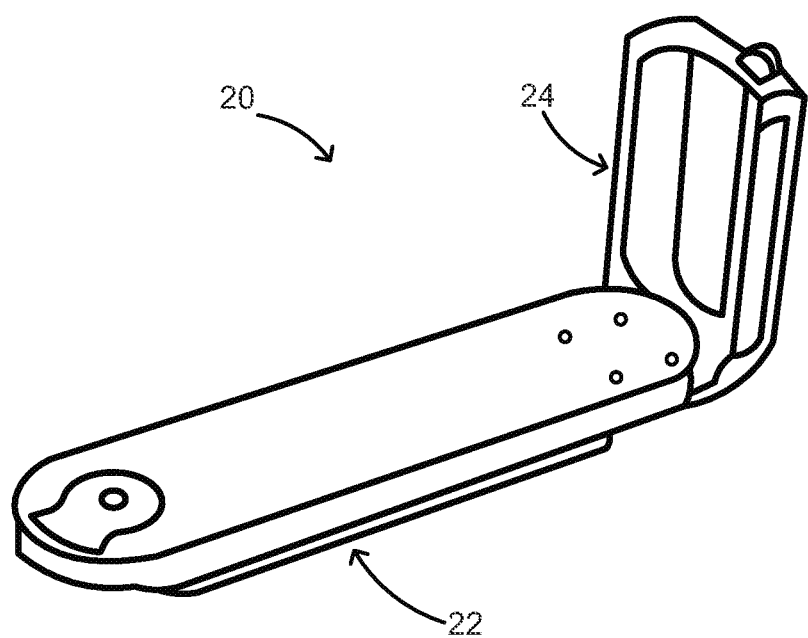
FIG. 9 is a perspective view of the camera mounting assembly of FIG. 1 configured with the base member and side member.

The mounting assembly 20 may be differently configured from its full configuration shown in FIG. 1 depending upon the requirements of the operator at a particular time. For example, the base plate 22 may be used by itself, as indicted in FIG. 7, to provide a quick-release mount for the camera 34. Or, as depicted in FIG. 8, the hand grip 32 may be detachably fastened to the base plate 22 to facilitate handling of the camera during freehand shooting. Alternatively, the base plate 22 and side plate 24 may be detachably fastened together, as indicated in FIG. 9, to permit the camera and assembly to be stably mounted on a vertical support in either a landscape or portrait orientation. It will be recognized that the modular construction of the assembly also permits the different components to be purchased at separate times in accordance with the budgetary constraints of the operator.

Figure 10:
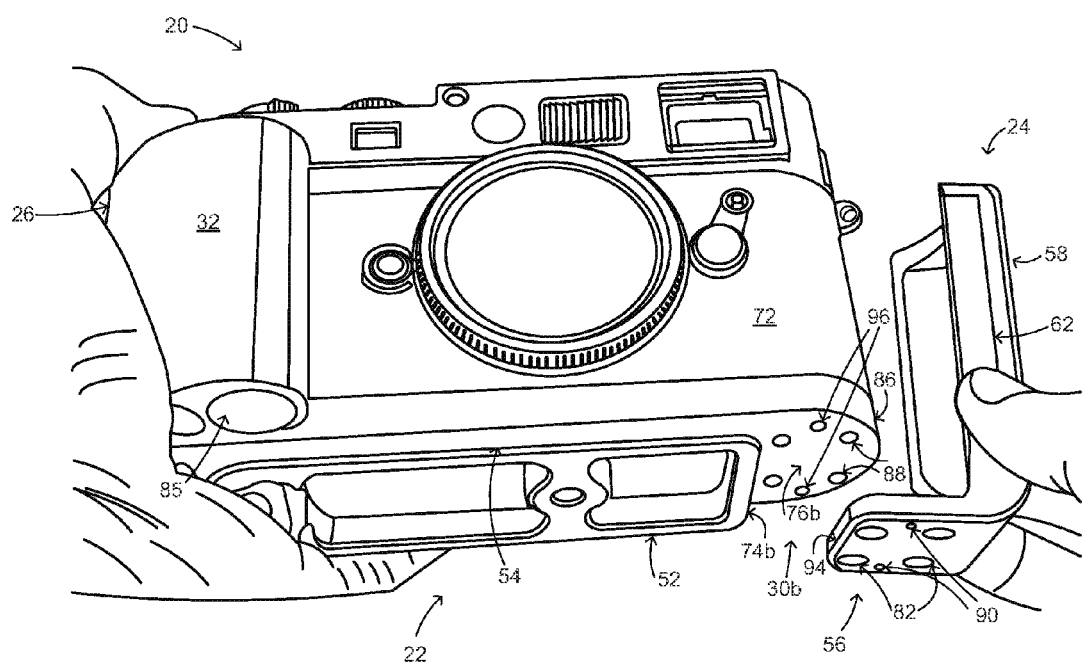
FIG. 10 is a perspective view of the camera mounting assembly of FIG. 1 showing, in particular, mounting features of the side member.

FIG. 10 shows the L-shaped side plate 24 about to be attached to the base plate 22. The L-shaped side plate 24 is detachably fastened by lower arm 56 to the base plate 22 at a lower corner portion 30b of the base plate. As evident in FIG. 10, the lower arm has a length substantially shorter than the length of both the base plate and the side arm 58 of the side plate. Indeed, as depicted, the lower arm is shorter than half the length of the side arm. This contrasts with conventional L-frames in which the lower arm, if not comprising the base member, is generally coextensive with the base member. The present side plate, with its reduced length lower arm, has a relatively flattened profile that may easily fit in the pocket of a transport bag or even be carried in the operator's breast pocket. The side plate also includes an eyelet 73 (FIG. 5) through which a camera strap may be passed for suspended support of the assembly 20.

Referring to FIG. 7, the lower corner portions 30a and 30b of the base plate 22 each define a stepped shoulder. Each stepped shoulder includes a back edge 74a and 74b, respectively, as defined by the raised central member 52, and a substantially flat ledge 76a and 76b, respectively. Referring to FIG. 5, the lower arm 56 of the L-shaped side plate 24 and the lower portion 78 of the second camera accessory 26 are each detachably fastened along a respective ledge so as to lie in substantially flush and abutting relationship with the raised central member of the base plate. This arrangement permits flexible configuration of the camera with different component options compatibly with a compact, streamlined construction that is free of any sharp edges that might snag the support or loose clothing during assembly remounts. Each ledge, moreover, is easily cleaned with just the wipe of a cloth, and there are no deep cavities needed for component mounting in which dirt or other debris may accumulate.

Figure 11:
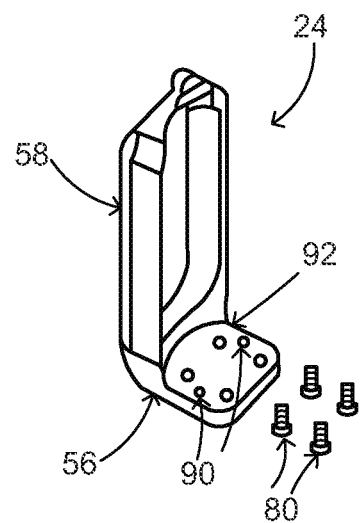
FIG. 11 is a perspective view showing further details of the side member of FIG. 1 together with its fasteners.
Figure 12:
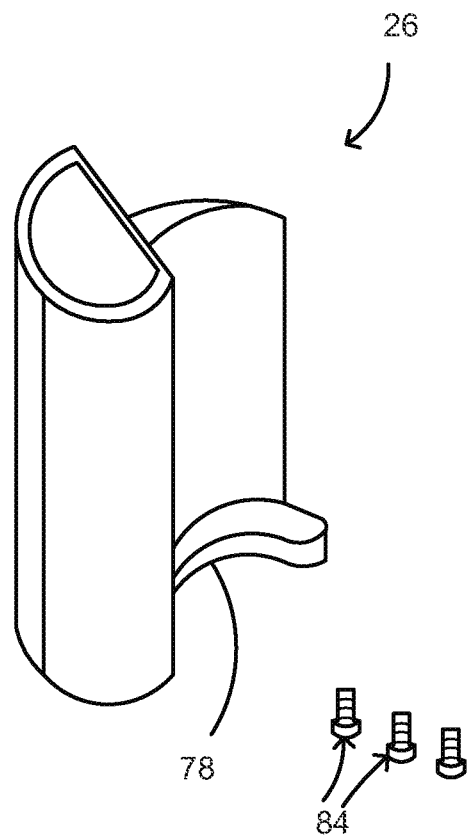
FIG. 12 is a perspective view showing further details of the hand grip of FIG. 1 together with its fasteners.

Referring to FIGS. 10 and 11, a plurality of socket screws 80 are used to detachably fasten securely the lower arm 56 of the side plate 24 to the ledge 76b. The lower arm defines a corresponding plurality of countersunk holes 82 to receive the heads of these screws so as to avoid any sharp or raised edges. Use of socket screws is preferred over slotted screws because with slotted screws, it is more likely that the screwdriver blade will slip during turning of the screws and damage the finish of the side plate 24 or base plate 22. Similarly, referring to FIGS. 7 and 12, a plurality of socket screws 84 are used to detachably fasten the lower portion 78 of the second camera accessory 26 to the ledge 76a. Referring to FIG. 10, a hollow chamber 85 may be formed in camera accessory 26 to reduce component weight.

Referring to FIG. 10, various elements of the side plate 24 and base plate 22 cooperate together to ensure that as the lower arm 56 of the side plate is placed against ledge 76b of the base plate, the lower arm self aligns automatically in a unique position relative to the rounded outer margin 86 of lower corner portion 30b. That is, the lower arm self aligns in precisely that position where the countersunk holes 82 in the lower arm exactly register with corresponding threaded holes 88 formed in the ledge. Referring also to FIG. 11, these elements include the back edge 74b, a pair of guide pins 90 upwardly projecting from the lower arm, and a rounded rim 92 formed along the inner surface of the lower arm. More specifically, in positioning the lower arm on the ledge 76b, preferably the distal edge 94 of the lower arm is brought to rest in abutment with the back edge 74b, the side arm is then shifted laterally (perpendicularly to the front surface 72 of the camera) until the guide pins slideably engage corresponding guide holes 96 in the ledge, and the side plate is then raised until the rounded outer margin 86 comes to rest against the rounded inner rim 92. The socket screws 80 may then be conveniently driven, one after another, through the perfectly aligned lower arm and ledge in order to detachably fasten securely together the side plate and base plate. By this procedure, then, quick reconfiguration of the mounting assembly 20 to include the side plate 24 is facilitated.

Figure 13:
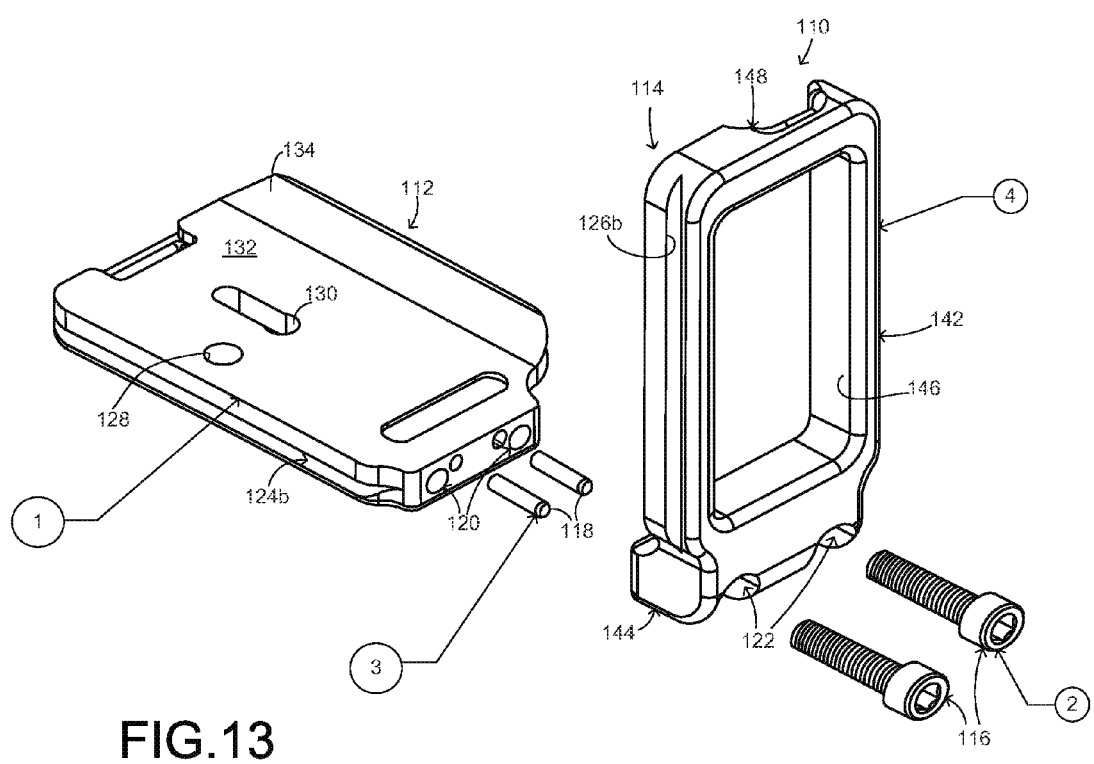
FIG. 13 is a perspective view showing a second embodiment of an exemplary camera mounting assembly configured to include a base member and side member.

Referring now to FIG. 13, this drawing illustrates a second embodiment of an exemplary camera mounting assembly 110 configured to include a base member or plate 112 and a side member or plate 114. This second embodiment shares several features with the first embodiment described above. For example, the members of this second embodiment are preferably precision machined from a lightweight and durable material, such as aluminum, and the side member is detachably fastened to the base member using one or more fastening elements 116, in this case, a pair of socket screws. As noted above, such modular construction permits the members to be conveniently purchased at different times, as the user's budget allows, and permits breakdown of the assembly for convenient transport. In addition, a projecting pair of guide pins 118 provide an automatic alignment mechanism that ensures the side member is properly positioned relative to the base member as the two are placed together for fastening, that is, that the socket screw holes 120 and 122 in the base and side plates, respectively, are precisely aligned. The guide pins prevent, moreover, lateral slippage between the base and side plates as the user starts to drive each socket screw into place. Countersinking of the screw holes 122 in the side plates and the flush alignment of the base and side plates along their attached edges contribute to the assembly's streamlined profile and avoid any sharp edges that might snag the support or loose clothing.

Figure 15:
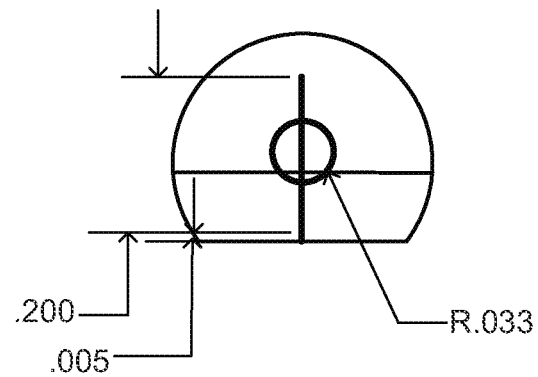
FIG. 15 is a side elevational view of the base member of FIG. 13.
Figure 15:
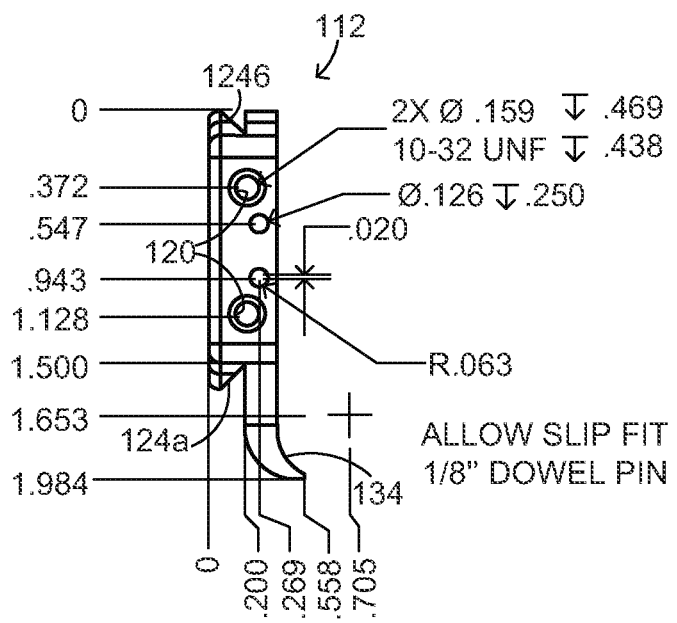
Figure 19:
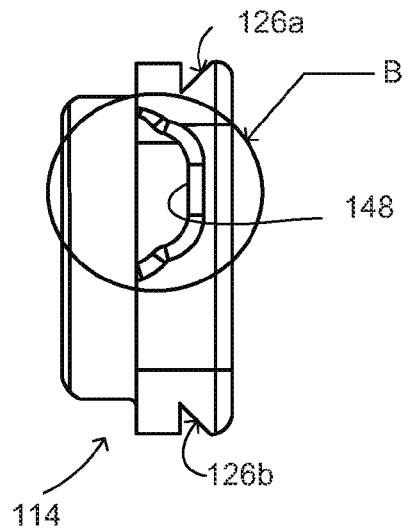
FIG. 19 is a top plan view of the side member of FIG. 13.
Figure 19:
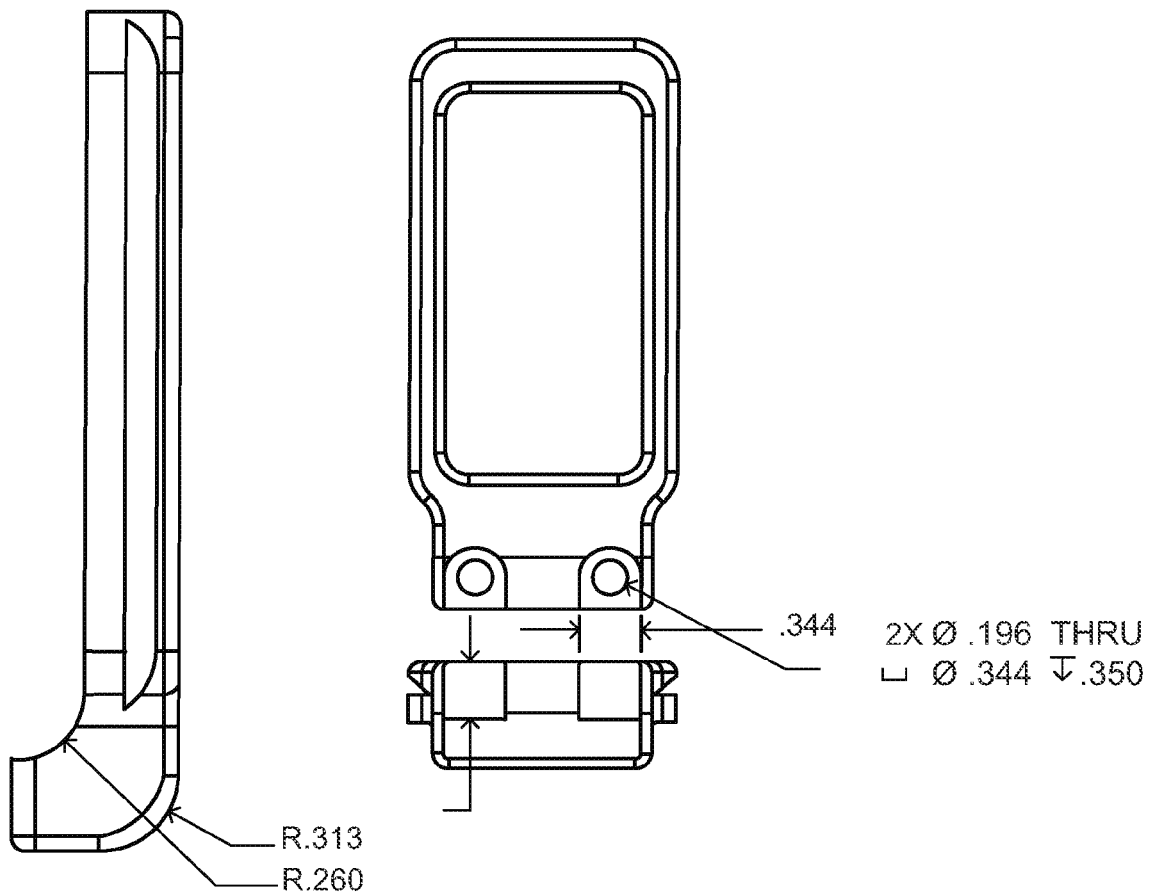

Referring to FIGS. 15 and 19, the base plate 112 and side plate 114 each form an opposite pair of elongate side slots 124a, b and 126a, b, respectively, each slot having at least one side inclining at a forty-five degree angle to the vertical to provide a dovetailed edge. These dovetailed slots enable quick attachment of each plate to the moveable jaws of a quick-release mechanism, in particular, to a quick-release mechanism known as the "ARCA-Swiss" style. Hence, a camera secured to the base plate 112 can be quickly repositioned on a vertical support provided with this mechanism between a landscape (horizontal) and a portrait (vertical) orientation in a manner similar to that depicted in FIGS. 5 and 6.

Referring to FIG. 13, the base plate 112 of assembly 110 forms a threaded hole 128 and a combination threaded hole and slot cavity 130. To secure the lower portion of the camera to base plate 112, preferably a knurl-headed screw (not shown) is driven through one or the other of these threaded passageways into a mounting hole in the camera's lower portion. The upper portion 132 of base plate 112 includes an inclined flange 134 shaped to conform to the back edge of the lower portion of the camera (the embodiment depicted is designed for a Canon 60*d* model). This ensures firm coupling between the plate and camera and thereby limits camera vibration.

Figure 14:
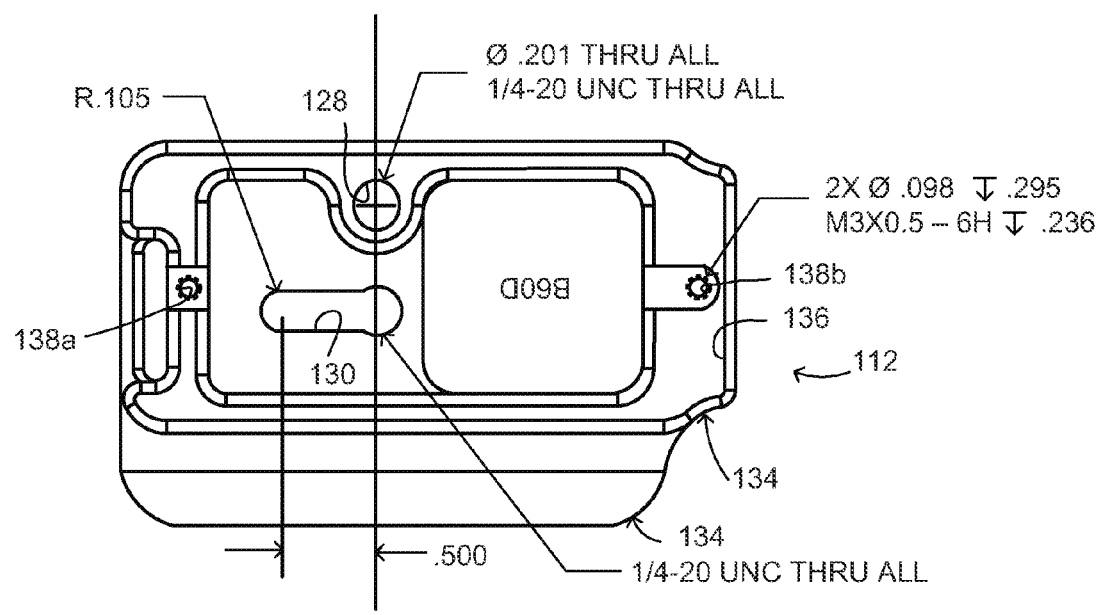
FIG. 14 is a plan view of the bottom of the base member of FIG. 13
Figure 16:
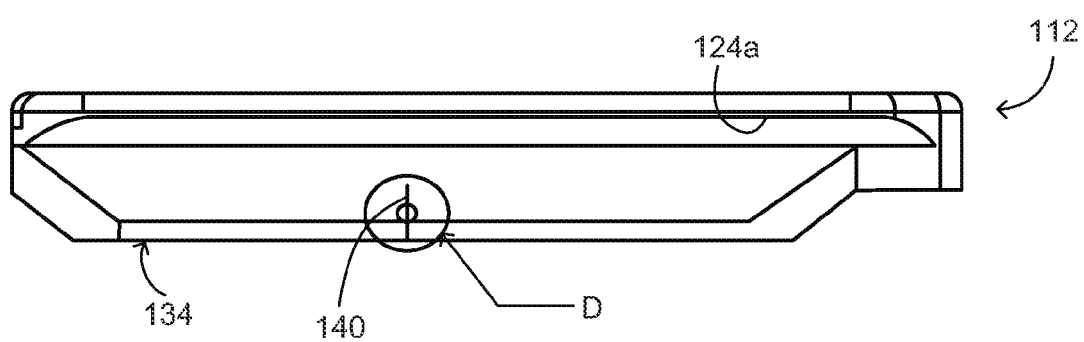
FIG. 16 is an elevational view showing details along the underside of the back flange of the base member of FIG. 13.

Referring to FIG. 14, the bottom portion 134 of the base plate 112 defines a hollowed-out chamber 136, which further reduces the plate's weight, and a laterally spaced pair of threaded holes 138*a, b*, which are designed to mount short stubs (not shown). These stubs extend freely into lateral cavities formed within the upper face of the quick-release mechanism and serve as safety stops. That is, when the slots 124*a, b* (FIG. 15) of the base plate are loosely engaged by the jaws of the mechanism, the base plate can slide relative to the jaws, but this lateral movement stops when one or the other stub hits an edge of the lateral cavity. Thus, for example, even if the user forgets to clamp tight the jaws to the base plate and the camera is pivoted about a ball joint, the base plate will still be retained by the quick-release mechanism and the camera will not accidentally drop. Referring to FIG. 16, an indentation or marking 140 is provided along the underside of the flange 134 to visually indicate where the base plate should be centered relative to the quick-release jaws to enable proper centering of the camera in the landscape position.

Figure 17:
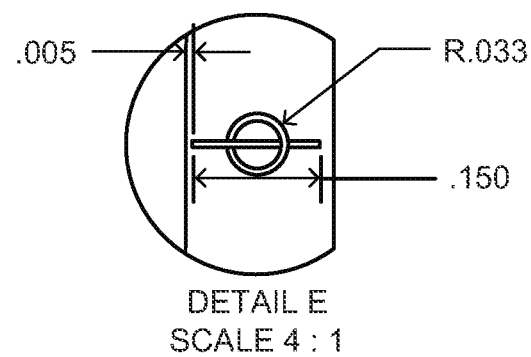
FIG. 17 is a side elevational view of the side member of FIG. 13.
Figure 17:
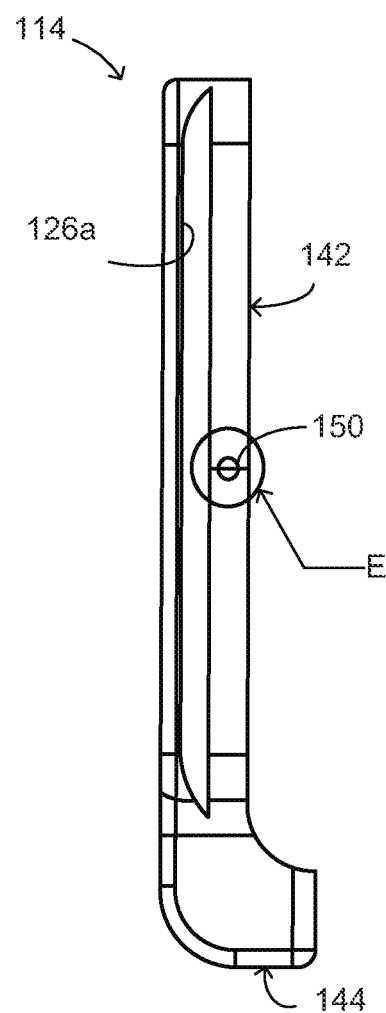
Figure 18:
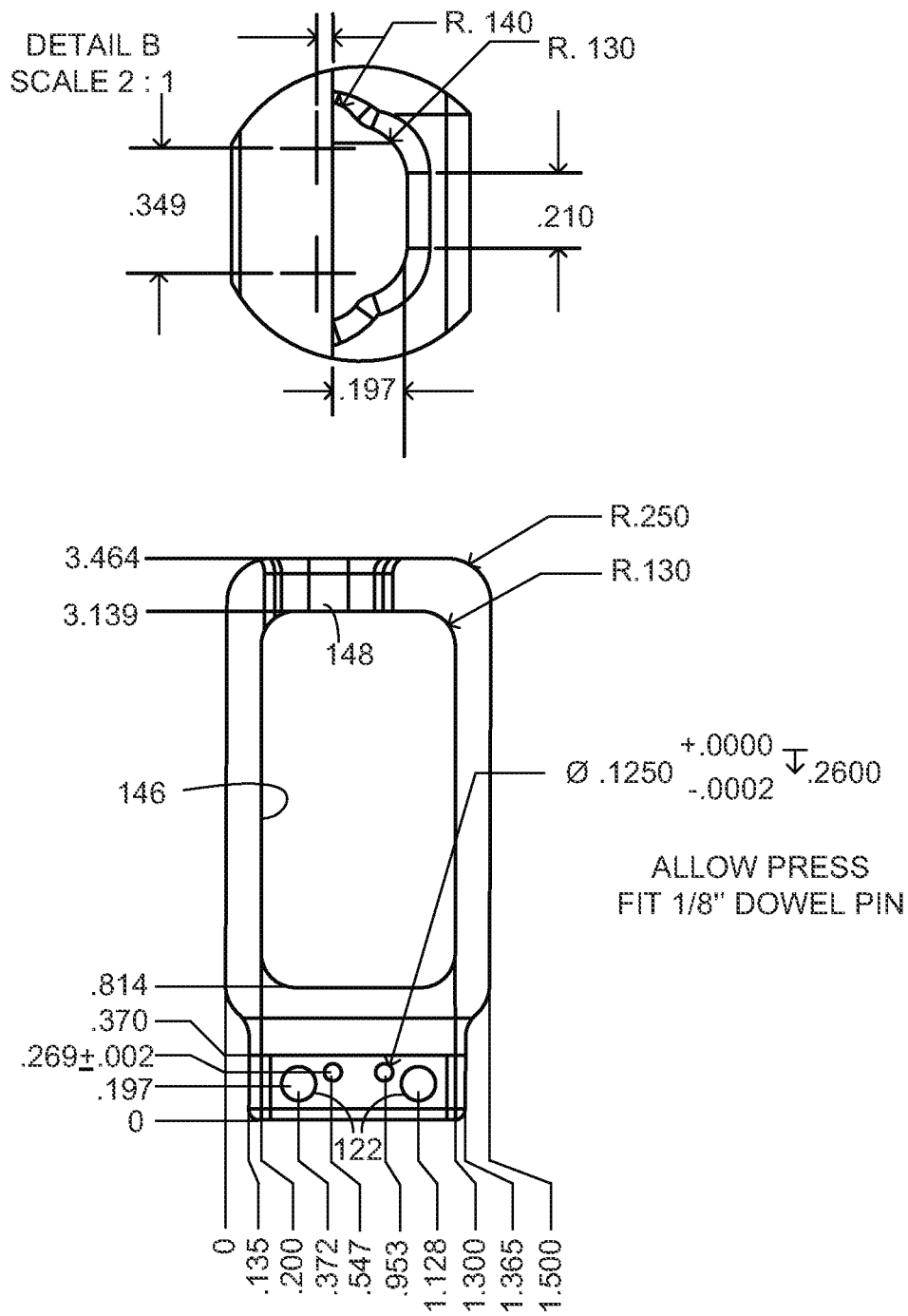
FIG. 18 is a rear plan view of the side member of FIG. 13.

Referring to FIGS. 13 and 17, the side plate 114 has a side arm 142 and a lower arm 144 in generally L-shaped arrangement, with the lower arm being substantially reduced in length relative to the side arm. The resulting streamlined profile of the side plate permits the plate to be conveniently transported even in a narrow pocket. Referring also to FIGS. 18 and 19, a cutout 146 formed in the center of the side arm and a notch 148 formed along the upper edge of the side arm provide easy access to the side of the camera for operating camera controls and routing any cabling. Similar to the base plate, the back side of the side arm includes an indentation or marking 150 (FIG. 17) to visually indicate where the side arm should be centered relative to the quick-release jaws to enable proper centering of the camera in the portrait position.

Two different embodiments 20 and 110 of the camera mounting assembly have now been described. It will be recognized that other variants are possible without departing from at least the broader principles of the invention. For example, instead of being configured as a hand grip, the second camera accessory may comprise a custom flash arm, a video microphone holder, or some other component. The number of screw holes and guide holes in each plate may be reduced from the number depicted. Other self-aligning mechanisms may be provided to ensure proper alignment between the base and side plates and to facilitate the fastening step. For example, a raised ledge or other projecting member may be used. The base and side members may take a form not limited to streamlined plates, possibly with or without the loss of one or more advantages, such as ease of manufacture, reduced weight, and convenience of transport. Conceivably, other methods may be used to detachably fasten the base member and the side member, such as detachable connection of the base member with the lower portion of the camera such that a lower arm of the side member is retained in sandwiched position therebetween. These examples are illustrative, though in no way exhaustive, of the types of variations possible.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A camera mounting assembly for adjustably mounting a camera on a vertical support, a quick-release mechanism being provided with the support, comprising:
   (a) a base member having an upper portion configured to support a lower surface of the camera and a lower portion forming an opposite pair of lower slots;
   (b) a side member forming an opposite pair of side slots; and
   (c) a fastening element configured to detachably fasten together said side member and said base member such that when the lower surface of the camera is supported by the base member, at least a portion of the side member is aligned with a side surface of the camera and such that a pair of moveable jaws of the quick-release mechanism are selectively engageable with the lower slots and side slots to adjustably mount the camera in a landscape orientation and a portrait orientation, respectively, while maintaining the camera in a generally centered position over the vertical support, said fastening element comprising a rotatable member accessible from said side surface of said camera when said lower surface of said camera is supported by said base member where rotation of said rotatable member detachably interconnects said side member to said base member when said camera is supported by said base member, said fastening element extends through at least a portion of said side member into at least a portion of said base member when said base member is fastened to said side member and said fastening element is removed from within said at least a portion of said base member when said side member is said detached from said base member, said base member being free from extending along a substantial portion of said side surface of said camera when said camera is supported by said base member and said side member is detached from said base member.

2. The camera mounting assembly of claim 1 wherein the side member includes a side arm and a lower arm in generally L-shaped arrangement, the side arm being aligned with the side surface of the camera when the lower surface of the camera is supported by the base member.

3. The camera mounting assembly of claim 2 wherein the lower arm has a length shorter than the length of both the base member and the side arm.

4. The camera mounting assembly of claim 3 wherein the lower arm has a length shorter than half the length of the side arm.

5. The camera mounting assembly of claim 1 wherein the upper portion includes an upwardly projecting lip defining a shallow receptacle for receiving, in close-fitted engagement, the lower surface of the camera.

6. The camera mounting assembly of claim 1 wherein the side member is detachably fastened to the base member by at least one socket screw.

7. A camera mounting assembly for adjustably mounting a camera on a vertical support, a quick-release mechanism being provided with the support, comprising:
   (a) a base member having an upper portion configured to receive a lower surface of the camera and a lower portion, the lower portion being adapted for selective mounting on the vertical support such that the camera is positioned in a landscape orientation;
   (b) a side member detachably fastenable to the base member such that at least a portion of the side member extends along a side surface of the camera received by the base member, the side member forming an opposite pair of side slots adapted for selective gripped engagement by a pair of moveable jaws of the quick-release mechanism such that the camera is adjustably mountable in a portrait orientation;
   (c) at least one of the base member and the side member including a pair of spaced apart elongate members extending within a portion of said base member and a portion of said side member to form an alignment mechanism for automatically aligning the base member and the side member as the base member and the side member are being positioned for detachable fastening in a manner independent of either of said base member and said side member being attached to said camera; and
   (d) a fastening element comprising a rotatable member accessible from said side surface of said camera when said lower surface of said camera is supported by said base member where rotation of said rotatable member detachably interconnects said side member to said base member when said camera is supported by said base member, said fastening element extends through at least a portion of said side member into at least a portion of said base member when said base member is fastened to said side member and said fastening element is removed from within said at least a portion of said base member when said side member is said detached from said base member, wherein said fastening element is separate from said alignment mechanism, said base member being free from extending along a substantial portion of said side surface of said camera when said camera is supported by said base member and said side member is detached from said base member.

8. The camera mounting assembly of claim 7 wherein the alignment mechanism includes a projecting member configured to limit relative movement of the base member and the side member.

9. The camera mounting assembly of claim 8 wherein the projecting member comprises a guide pin.

10. The camera mounting assembly of claim 8 wherein the alignment mechanism includes a stepped shoulder on the lower portion of the base member, the shoulder portion having a back edge, and wherein the side member has a distal edge configured to be placed in sliding abutment with the back edge as the base member and the side member are being positioned for detachable fastening.

11. The camera mounting assembly of claim 10 wherein the alignment mechanism includes a rounded outer margin on a lower corner portion of the base member and the side member has a rounded inner rim configured to rest against the rounded margin.

12. The camera mounting assembly of claim 7 wherein in either of the landscape orientation and the portrait orientation, the lens of the camera is substantially centered over the vertical support.

13. The camera mounting assembly of claim 12 wherein the side member has a marking to visually indicate where the side slots are to be selectively engaged by the moveable jaws of the quick release mechanism in order to maintain the lens of the camera substantially centered over the vertical support.

14. The camera mounting assembly of claim 7 further including a separate fastening element configured to detachably fasten together said side member and said base member.

15. The camera mounting assembly of claim 7 wherein the side member is generally L-shaped having a side arm and a lower arm and the base member and lower arm are substantially flush with each other when the base member and the side member are detachably fastened together.

16. The camera mounting assembly of claim 7 further including a hand grip included on the base member to selectively facilitate freehand support of the camera.

17. The camera mounting assembly of claim 16 wherein the hand grip is detachably fastened to the base member.

18. A camera mounting assembly for adjustably mounting a camera on a vertical support, a quick-release mechanism being provided with the support, comprising:
   (a) a base member having an upper portion adapted to engage a lower surface of the camera and a lower portion adapted to be selectively mounted on the vertical support such that the camera is positioned in a landscape orientation;
   (b) a side member having a side portion forming an opposite pair of inclined edges;
   (c) at least one fastening element adapted to detachably fasten the side member and the base member such that when the camera is engaged by the base member, the side portion of the side member is aligned with a side surface of the camera whereupon the inclined edges are positioned for selective gripped engagement by a pair of moveable jaws of the quick-release mechanism so as to position the camera in a portrait orientation; and
   (d) said fastening element comprising a rotatable member accessible from said side surface of said camera when said lower surface of said camera is supported by said base member where rotation of said rotatable member detachably interconnects said side member to said base member when said camera is supported by said base member, said fastening element extends through at least a portion of said side member into at least a portion of said base member when said base member is fastened to said side member and said fastening element is removed from within said at least a portion of said base member when said side member is said detached from said base member, said base member being free from extending along a substantial portion of said side surface of said camera when said camera is supported by said base member and said side member is detached from said base member.

19. The camera assembly of claim 18 wherein the fastening element comprises a screw.

20. The camera assembly of claim 19 wherein the screw comprises a socket screw.

21. The camera assembly of claim 18 wherein the fastening element detachably fastens the base member and the side member independently of engagement of the base member with the camera.

22. The camera assembly of claim 18 wherein at least one of the base member and side member includes a projecting member configured to limit relative movement of the base member and the side member and to hold the base member and side member in a fixed position relative to each other during fastening with the fastening element.

* * * * *